(12) United States Patent
Barrett et al.

(10) Patent No.: US 12,315,005 B2
(45) Date of Patent: May 27, 2025

(54) SYSTEM AND METHOD FOR PROCESSING TRANSACTION RECORDS FOR USERS

(71) Applicant: Expensify, Inc., San Francisco, CA (US)

(72) Inventors: David M. Barrett, San Francisco, CA (US); Kevin Michael Kuchta, San Francisco, CA (US)

(73) Assignee: Expensify, Inc., San Francisco, CA (US)

( * ) Notice: Subject to any disclaimer, the term of this patent is extended or adjusted under 35 U.S.C. 154(b) by 0 days.

(21) Appl. No.: 18/136,293

(22) Filed: Apr. 18, 2023

(65) Prior Publication Data

US 2023/0377032 A1 Nov. 23, 2023

Related U.S. Application Data

(63) Continuation of application No. 16/733,119, filed on Jan. 2, 2020, now Pat. No. 11,663,654, which is a continuation of application No. 16/209,766, filed on Dec. 4, 2018, now Pat. No. 10,565,568, which is a continuation of application No. 14/887,079, filed on Oct. 19, 2015, now Pat. No. 10,210,581, which is a continuation of application No. 14/489,357, filed on (Continued)

(51) Int. Cl.
| | |
|---|---|
| *G06Q 40/02* | (2023.01) |
| *G06Q 20/04* | (2012.01) |
| *G06Q 40/12* | (2023.01) |
| *G06V 10/98* | (2022.01) |
| *G06V 30/224* | (2022.01) |
| *G06V 30/413* | (2022.01) |

(52) U.S. Cl.
CPC .......... *G06Q 40/02* (2013.01); *G06Q 20/045* (2013.01); *G06Q 40/12* (2013.12); *G06V 10/98* (2022.01); *G06V 30/224* (2022.01); *G06V 30/413* (2022.01)

(58) Field of Classification Search
None
See application file for complete search history.

(56) References Cited

U.S. PATENT DOCUMENTS

| | | | |
|---|---|---|---|
| 5,578,808 | A | 11/1996 | Taylor |
| 6,018,735 | A | 1/2000 | Hunter |

(Continued)

FOREIGN PATENT DOCUMENTS

GB 0621189.0 12/2006

OTHER PUBLICATIONS

"Scrape Boat", captured Aug. 31, 2009, available at https://web.archive.org/web/20090831133945/http://www.scrapegoat.com/faqs.php (Year:2009).

*Primary Examiner* — John B Strege
*Assistant Examiner* — Elisa M Rice
(74) *Attorney, Agent, or Firm* — Mahamedi IP Law LLP

(57) ABSTRACT

A computer system can implement a network service by receiving, from a computing device of a user, image data comprising an image of a record. The computer system can then execute image processing logic to determine a set of information items from the image. The computer system may then execute augmentation logic to process the record by (i) accessing a transaction database to identify a plurality of transactions made by the user, (ii) identifying a matching transaction from the plurality of transactions that pertains to the record, and (iii) resolving the set of information items using the matching transaction.

20 Claims, 4 Drawing Sheets

Related U.S. Application Data

Sep. 17, 2014, now Pat. No. 9,196,006, which is a continuation of application No. 13/469,016, filed on May 10, 2012, now Pat. No. 8,861,861.

(60) Provisional application No. 61/484,654, filed on May 10, 2011.

(56) References Cited

U.S. PATENT DOCUMENTS

| | | | |
|---|---|---|---|
| 6,043,819 A | 3/2000 | LeBrun | |
| 6,065,675 A | 5/2000 | Teicher | |
| 6,129,273 A | 10/2000 | Shah | |
| 6,341,353 B1 | 1/2002 | Herman | |
| 6,473,500 B1 | 10/2002 | Risafi et al. | |
| 6,615,190 B1 | 9/2003 | Slater | |
| 7,069,240 B2 | 6/2006 | Spero et al. | |
| 7,104,443 B1 | 9/2006 | Paul et al. | |
| 7,127,426 B1 | 10/2006 | Coyle | |
| 7,249,092 B2 | 7/2007 | Dunn et al. | |
| 7,252,223 B2 | 8/2007 | Schofield | |
| 7,280,644 B2 | 10/2007 | Tamari et al. | |
| 7,401,731 B1 | 7/2008 | Pletz et al. | |
| 7,475,808 B1 | 1/2009 | Bishop | |
| 7,571,142 B1 | 8/2009 | Flitcroft et al. | |
| 7,797,192 B2 | 9/2010 | Mitchell | |
| 7,865,432 B2 | 1/2011 | Doran et al. | |
| 8,345,981 B2 | 1/2013 | Schmidtler et al. | |
| 8,560,353 B2 | 10/2013 | Smith | |
| 9,245,296 B2 | 1/2016 | Nuggehalli | |
| 9,275,418 B2 | 3/2016 | Johansen | |
| 9,614,899 B1 | 4/2017 | Rukonic | |
| 10,115,083 B1 | 10/2018 | Koeppel | |
| 10,540,646 B2 | 1/2020 | Schlosser | |
| 10,540,724 B2 | 1/2020 | Whitley | |
| 10,915,872 B1 | 2/2021 | Bickerstaff | |
| 11,321,560 B2 | 5/2022 | Jennings | |
| 11,663,655 B2 | 5/2023 | Benkreira | |
| 2001/0029484 A1 | 10/2001 | Schultz | |
| 2003/0222136 A1 | 12/2003 | Bolle et al. | |
| 2005/0060437 A1 | 3/2005 | Doyle | |
| 2005/0091153 A1 | 4/2005 | Monk | |
| 2005/0182711 A1 | 8/2005 | Pulkkinen et al. | |
| 2006/0155641 A1 | 7/2006 | Postrel | |
| 2006/0206425 A1 | 9/2006 | Sharma | |
| 2006/0218024 A1 | 9/2006 | Lulla | |
| 2006/0230004 A1 | 10/2006 | Handley | |
| 2007/0069013 A1 | 3/2007 | Seifert | |
| 2007/0164106 A1 | 7/2007 | McDevitt | |
| 2007/0250441 A1 | 10/2007 | Paulsen et al. | |
| 2007/0255650 A1 | 11/2007 | Destrempes et al. | |
| 2008/0017703 A1 | 1/2008 | Lu et al. | |
| 2008/0028473 A1 | 1/2008 | Cehelnik | |
| 2008/0046347 A1 | 2/2008 | Smith | |
| 2008/0103972 A1 | 5/2008 | Lanc | |
| 2008/0313066 A1 | 12/2008 | Sholtis | |
| 2009/0164344 A1 | 6/2009 | Shiftan | |
| 2009/0228380 A1 | 9/2009 | Evanitsky | |
| 2009/0249194 A1 | 10/2009 | Day | |
| 2009/0271265 A1 | 10/2009 | Lay et al. | |
| 2009/0271322 A1 | 10/2009 | Lay | |
| 2010/0332265 A1 | 12/2010 | Smith | |
| 2011/0096983 A1 | 4/2011 | Jensen | |
| 2012/0203644 A1 | 8/2012 | Phillips | |
| 2012/0221446 A1 | 8/2012 | Grigg | |
| 2013/0129218 A1 | 5/2013 | Barrett | |
| 2013/0305182 A1 | 11/2013 | Marseille | |
| 2015/0003734 A1 | 1/2015 | Barrett | |
| 2016/0042471 A1 | 2/2016 | Barrett | |
| 2018/0089752 A1 | 3/2018 | Barrett | |
| 2019/0114599 A1 | 4/2019 | Barrett | |
| 2020/0210971 A1 | 7/2020 | Barrett | |

SYSTEM AND METHOD FOR PROCESSING TRANSACTION RECORDS FOR USERS

RELATED APPLICATIONS

This application is a continuation of U.S. patent application Ser. No. 16/733,119, filed on Jan. 2, 2020; which is a continuation of U.S. patent application Ser. No. 16/209,766, filed on Dec. 4, 2018 and now issued as U.S. Pat. No. 10,565,568; which is a continuation of U.S. patent application Ser. No. 14/887,079, filed on Oct. 19, 2015 and now issued as U.S. Pat. No. 10,210,581; which is a continuation of U.S. patent application Ser. No. 14/489,357, filed Sep. 17, 2014 and now issued as U.S. Pat. No. 9,196,006; which is a continuation of U.S. patent application Ser. No. 13/469,016, filed May 10, 2012 and now issued as U.S. Pat. No. 8,861,861; which claims benefit of priority to Provisional U.S. Patent Application No. 61/484,654, filed May 10, 2011; all of the aforementioned applications being hereby incorporated by reference in their respective entireties.

TECHNICAL FIELD

Embodiments described herein pertain generally to a computer-implemented system and method for processing receipts and other records of users.

DETAILED DESCRIPTION

Figure 1:
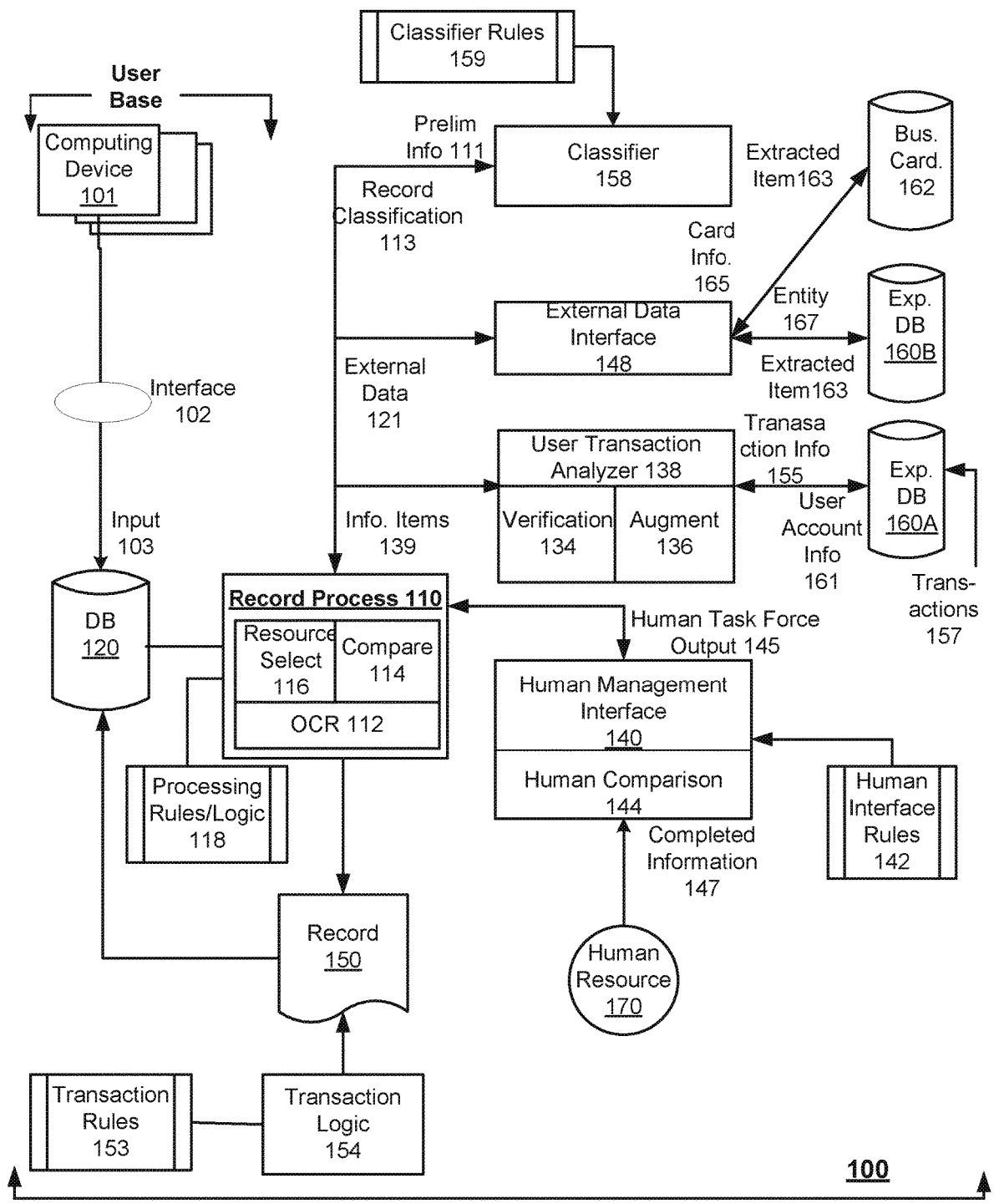
FIG. 1 illustrates a system for processing images of receipts and other records of users, according to one or more embodiments.

Embodiments described herein include a system and service for processing for processing receipts and other records of users. In particular, embodiments described herein enable users to capture images of records (e.g., receipts, business cards, odometer readings, travel itineraries) and to submit the images so that the records are processed. The users are able to submit their images to a service that processes the records appropriately, based on the classification of the record. For example, receipts can be recorded as expenses or otherwise associated with financial accounts or resources of the user.

According to an embodiment, a user can transmit a low quality image of a record to a service. The service can perform optical character recognition (OCR) on the image to determine a first set of information items about the record. A second set of information items can be identified that are likely part of the record, but not deemed determinable from performing OCR on the image. Another resource can be utilized to determine the second set of information items. A classification for the record can be determined based on first and second sets of information items. The record can be associated with a financial resource of the user based at least in part on the classification.

Embodiments as described may be implemented in the context of a system that aggregates financial information of a user from various sources, such as financial institutions (e.g., credit card companies). In a financial or data aggregation context, embodiments enable users to perform activities such as uploading receipts and business cards, and then having information from the uploaded item analyzed and aggregated.

In one embodiment, a system is provided in which information is received that corresponds to an image or scanned version of a record that the user possesses in physical form. As examples, an image can be captured from a receipt, odometer reading, printed travel itinerary (or snapshot of such) or business card. In one embodiment, the image is stored in a database. Information captured or processed from the image can be maintained as an electronic record, and used to classify the record.

According to one or more embodiments, images of records are obtained from one or more networked devices having image capture and/or transfer capabilities. Such devices may include mobile phones, tablet computers and other devices that include camera or image capturing functionality.

In an embodiment, an electronic record is processed by a resource (programmatic, human or hybrid) in order to: (i) classify the record (e.g., receipt, what kind of receipt, business card, etc.); (ii) augment information in the record with information that is determined from other sources; and/or (iii) reconcile the record with information contained in a corresponding electronic record.

Still further, in some embodiments, the electronic record is processed to identify one or more tasks. Such tasks may be generated based on the information provided by the user. The information is then assigned to two or more resources, each of which classify the information as, for example, a receipt, travel itinerary, odometer reading, or a business card. In some instances, a user may be charged with submitting a record for processing. For some kinds of records, however, some variations provide for the user to be credited. For example, if the image is of a business card with a valid email address that does not already correspond to an existing user of the system (e.g., a new referral to the system), the credit balance associated with the user who submitted the information is increased. Thus, alternative variations provide for a referral fee or award may be charged to the user based on certain records the user submits.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed.

In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

In financial transactions, a user of the system conducts correspondences with another person or entity, and the submission of data corresponding to the interaction causes an account associated with the user to be either credited or debited. In certain embodiments, the financial transaction may be one or more of a receipt, a travel itinerary, an odometer reading, a business card or a combination thereof.

System and Service Description

FIG. 1 illustrates a system for processing images of receipts and other records of users, according to one or more embodiments. A system such as described by FIG. 1 may be implemented in various computing environments. In one embodiment, system 100 is provided as an online service, supported by a server or combination of servers. More specifically, a system such as described by FIG. 1 is generally implemented under a secure computing environment, to protect financial information of its users. In some embodiments, users of the service may interact with the service using a web browser (e.g., thin or non-client), or through a designated client application. Numerous different types of computing devices operated by users are enabled to interface with the service in order to perform activities enabled by embodiments described herein. In other implementations, alternative computing environments (e.g., client-centric) may be used to implement embodiments described herein.

According to some embodiments, electronic records can be created to represent one or more financial transactions or events (e.g., images of receipts, odometer readings, travel itineraries), and then stored in the database 120. The database 120 (or data stored therein) may be accessible to one or more programmatic sources that can analyze or otherwise process the electronic records. In one embodiment, receipt data is made accessible to a programmatic resource.

Still further, in certain embodiments, the programmatic sources include one or more components or modules configured to classify, reconcile, and augment the receipt data.

As an addition or variation, the programmatic sources may also include interfaces to a human workforce that can process the records in bulk to determine select information items. For example, the human workforce can be provided as part of Amazon Mechanical Turk.

More specifically, in some embodiments, system 100 includes components for (i) enabling individuals to capture and/or transmit information corresponding to a record (e.g., for a financial transaction), (ii) extract and store information from the record (or image thereof), (iii) create tasks for one or more resources to extract the information, and/or (iv) credit or debit an account associated with the user that submitted the record.

According to at least some embodiments, system 100 is capable of processing images of records, as selected by the users of the system. The images can include low quality images of records, which can be captured on, for example, camera phones, tablets or other portable devices. While such devices carry functionality such as auto-focus, which makes image capture of, for example, documents possible, the images can be difficult to programmatically decipher, as the environment and media of the record are relatively uncontrolled. For example, a user may capture an image of a receipt in bad lighting, or with over-lighting. Furthermore, the receipt can be wrinkled or off-center. Embodiments recognize that such variability in the images can yield to poor results from performance of OCR.

According to some embodiments, system 100 processes digital images of records as submitted by its user base. Examples of records include credit card receipts, cash receipts, sales receipts, odometer readings (or other readings from other meters), or business cards.

In certain embodiments, the computing device 101 may be a handheld device, such as, for example, a mobile phone, tablet or multi-function device, that is connectable to a network (e.g., cellular network, Wireless Fidelity 802.11(a), (b), (g), or (n), Ethernet, the Internet etc.) to communicate with the system 100. The computing devices 101 can be configured to capture and/or transfer one or more images of financial transactions or events, including credit card receipts, cash receipts, vouchers, travel itineraries and fares, odometer readings, and business cards.

In certain embodiments, the image may be a raster formatted image such as a JPEG, PNG or GIF. In another embodiment, the image may be in a vector format such as a PDF, SVG, PostScript or Adobe Illustrator.

It is also contemplated that multiple financial transactions (e.g., multiple receipts, business cards, odometer readings, travel itineraries, etc.) may be included in a single image file. In such cases, when the image data is analyzed, each financial transaction included in the image data may be processed and analyzed separately.

Although image data is specifically mentioned, it is also contemplated that information corresponding to the financial transaction may be submitted and/or stored in the form of video, such as MPG, MP4, and Flash. Furthermore, it is also contemplated that each video submission may include multiple financial transactions (e.g. one or more receipts, odometer readings, travel itineraries, business cards or combinations thereof). In such implementations, each distinct financial transaction included in the video is processed as a separate transaction.

In still yet another implementation, the financial transaction information may be transmitted and/or stored as audio data with the user describing information corresponding to one or more financial transactions. For example, if the financial transaction corresponds to a receipt, the audio information may include a date, type of credit card/debit card used, the amount of the transaction, the location the transaction took place, a merchant name, etc. As with the image data and/or video data, the audio data may include multiple financial transactions and each financial transaction is analyzed independently from the other financial transactions.

In more detail, system 100 includes an interface 102 to communicate with computing devices 101 that comprise a user or subscriber base for service provided to system 100.

The interface 102 can correspond to, for example, the website that maintains accounts for individual users. The users can login to a website and both submit information, including copies and receipts, and also view information, such as expense reports. In an embodiment, computing devices 101 communicate with system 100 through the interface 102 to provide image inputs 103. Each image input 103 can be received and associated with the user account. As shown in an example, the image inputs 103 are stored in the database 120, which maintains information for individual user accounts. The information maintained for individual user accounts include, for example, (i) a user profile (including password and login), (ii) financial account information, such as credit or debit card transactions and card numbers, and (iii) bank account information. Various kinds of other information may also be maintained, such as for example, information from other user accounts, past transactions, odometer readings, tax information, images of receipts, contacts (e.g., business cards), and online reports.

The system 100 includes a record processing module 110, the database 120, and one or more modules to facilitate processing of images of records submitted from users. As an example, a given user can capture an image of a receipt, and submit the image 103 to the service, where it is stored in the database 120 and linked with the user service account. When the image input 103 is received, the record processing module 110 processes the image data using, for example, one or more optical character recognition (OCR) processes 112. The record processing module 110 can make a determination from the output of the OCR 112 as to whether sufficient information items have been extracted from the image input 103 in order to process the record.

In particular, the records that are conveyed by image input 103 can be classified by kind or type. Furthermore, based on the classification, the records can be associated with a particular financial resource of the user. Among other functionality, the records provided through the image input 103 can be analyzed in order to generate reports, including expense reports or other information. Alternatively, some kinds of records may link to financial accounts of the user. As examples, a cash receipt can be associated with a portion of a user's account that reflects cash expenses. Credit card receipts can be associated as an expense, and with the corresponding financial account on which the credit card is drawn. Odometer readings can link to expenses of the user. A travel itinerary can be provided with the users account through system 100, and optionally be assigned as an expense of the user. Business cards can also be linked with the user account through system 100.

Record Processing with OCR and Sufficiency

The record processing module 110 may identify different sets of information items as requirements of sufficiency in order to properly process a record of a particular kind for an intended purpose. Thus, the treatment of the record through system 100, as well as information needed from the record, can be determined from the classification of the record conveyed in the image input 103. According to some embodiments, the OCR 112 operates to determine a first set of information items about the record depicted in the image input 103. If sufficient information is determined from OCR 112, the record can be stored in the database 120 and associated with the appropriate user financial resource. If however, insufficient data items are determined from OCR 112, one or more embodiments provide for use of additional programmatic and/or semi-programmatic resources for facilitating determination of additional information items for properly processing the record.

Classifying Record Depicted in Image Input

Initially, record processing module 110 can use a classification component to make a determination as to the classification 113 of the record conveyed through the image input 103. The classification component 158 (shown as classifier 158) executes to classify the financial transaction or event represented in the electronic record. For example, the electronic record can correspond to an image of a receipt of a financial transaction, or it can correspond to a business card or other record or event (e.g., travel itinerary or an odometer reading).

In some implementations, the classification component 158 is configured to classify the information contained in the record to additional granularity. For example, for receipts of financial transactions, the classifier 158 may classify the business establishment or merchant as being of a particular kind (e.g., restaurant, store etc.).

In various embodiments, the classification component 158 can use a variety rules, processes and techniques in order to determine the classification 113 of the record. For example, image processing and/or OCR 112 can be utilized in order to determine preliminary information 111 about the record. For example, the geometry of the record can indicate that the record is a business card, particularly if the OCR output identifies seven or ten digit numeric codes (e.g., corresponding to phone numbers). Likewise, the presence of dollar amounts or words like "cash" can be highly indicative of a record that is a receipt. In this way, the classification component 158 may use a set of classification rules 159 in order to determine the type or kind of record, based on partial or preliminary information 111, which includes record characteristics that are highly indicative of a particular type of record. In this way, the record conveyed by image input 103 can be classified as a receipt, odometer reading or business card.

In some embodiments, the record processing module 110 can determine what information would be sufficient to appropriately process the record based on the determination of the record type. Specifically, some embodiments recognize that different types of records can require different types of information items. For example, the information that would be deemed sufficient for receipts include a total dollar amount and a date of transaction. Business cards, on the other hand, would require a name and phone number. Likewise, if the record is recognized as an odometer reading, the record processing module 110 would not attempt to determine, for example, a total amount of the transaction or a date, but rather a multi-digit number.

Embodiments recognize that image input 103 can be a low quality reproduction of a record. In an embodiment, the OCR 112 attempts to extract sufficient information to enable the salient information items of the particular type of record to be determined. For receipts, sufficient information items would include, for example, a total amount of the transaction, the date of the transaction, and the merchant or vendor that was a party to the transaction. For business cards, sufficient information would include information corresponding to contact name, and a phone number and/or e-mail address. If the information determined from the OCR 112 is insufficient, then other resources can be used to attempt to determine information items that are needed to sufficiently process the record.

Use of Transactions Listed with User Accounts to Augment or Reconcile Determinations More specifically, if the OCR 112 fails to yield a result that includes sufficient information, embodiments provide for the use of additional resources to determine the information items of the record. Such additional resources can be external (or extrinsic) to the image input, or even to the record depicted by the image. System 100 can include a user-specific transaction analyzer 138 that can provide information items 139 for determining some or all of the information items that not determinable. In particular, the transaction analyzer 138 can communicate with a database 160A which maintains transaction entries 157 as provided from various financial institutions and account managers (e.g., online credit card or checking/debit accounts) of the individual users. In this way, the transaction analyzer 138 can reference the user's account information (e.g., credit card information) with the database 160A to determine transaction information 155. In particular, the transaction information 155 can include transactions that identify a date, a merchant or an amount. However, embodiments also recognize that the transaction information 155 can misstate the date of the transaction (e.g., the date can be the business day that follows the transaction, or the date that the financial institution of the merchant reports), the name of the merchant (e.g., the name of the merchant can be abbreviated or altered) or even the total amount (e.g., state restaurant bill without tip).

In some embodiments, the transaction analyzer 138 includes augmentation logic 136, (e.g., rule-based logic) to analyze transaction information 155 and determine information items that would supplement information determined from OCR 112 or other sources. In particular, augmentation logic 136 can determine additional information that may not have been included on the image data of the receipt but is contained in, for example, the transactions 157 of the user. For example, if a receipt does not include the merchant's name, augmentation logic 136 can be configured to determine, based on transaction information 155, the merchant for which the receipt was generated. In yet another embodiment, a merchant may not actually debit or credit a financial account of the user until two or three days after the date posted on the receipt. In such cases, augmentation logic 136 can be configured to search a date range associated with the image data on the receipt in order to find a matching transaction. If a matching transaction is found within the date range, augmentation logic 136 can automatically approximate or insert the date of the receipt to correspond to the date reflected by the particular transaction entry 157. As another example, the transaction information 155 can identify a specific merchant on a date that is within a date range specified by the record under analysis, while the record processing module 110 is unable to decipher the merchant name using other processes such as OCR 112. The identification of the record name can then be used to augment the results of the OCR 112.

In variations, the transaction analyzer 138 can provide clues for determining some or all of the information items that are not otherwise determinable from the output of the OCR 112. For example, in the case when the image input 103 is for a cash receipt, the transaction information 155 can attempt to fill-in for the name of the merchant by identifying a list of likely merchants based on past-purchasing behavior of the user. The transaction information 155 can also identify a likely geography or locality of the user (e.g., zip code) to enable the record processing module 110 to narrow the names of possible merchants.

In the case of a credit card receipt, for example, a date range may be determined from the OCR 112 for querying transaction entries 157. The merchant on the receipt may be matched to a particular transaction entry based on, for example, the OCR 112 determining a total number of letters that are the same as that of a given transaction entry. For credit card receipts, the transaction analyzer 138 can augment the output of the OCR 112 by providing, for example, the name of the merchant (or an identifier for the merchant name).

As an addition or variation, embodiments recognize that the OCR 112 can have an error rate, particular as to the use of low quality input images. As such, the transaction analyzer 138 can also be used to reconcile or verify the determinations of the OCR 112. The transaction analyzer 138 can include verification logic 134 that utilizes the transaction information 155 to reconcile information contained on the receipt data with the information provided by the transaction entries 157. For example, if the image of the receipt is from a restaurant, but the image data associated with the receipt did not include the tip, verification logic 134 can retrieve transaction information 155 that identifies the total amount for the meal including the tip. As such, when generating the expense report, the true cost of the meal will be reflected. Additionally, rule-based logic may be used to check, for example, dates, names or total amounts of receipts. For example, if a cash receipt is scanned and determined by the OCR 112 to be for a particular merchant, the OCR determination can be verified (despite the high error rate) if the merchant is one that the user has previously transacted with, as determined from the transaction entries 157.

Use of External Data Sources to Supplement Determinations of Information Items

In some embodiments, the record processing module 110 may also access one or more external data interfaces 148 to supplement information that was programmatically determined. The external data resources can include interfaces to specific databases, such as Yellow Pages, business name directories, travel databases, and other information which a record process module 110 can use to verify or augment the results of its OCR processing. In one embodiment, the external data interface 148 accesses a business directory database 160B to check extracted data items 163, such as the name of the business entity as determined from the OCR 112.

An output of the external data interface 148 can include external data 121 that includes information items that supplement information items determined from other sources, such as through OCR 112. For example, the output of the external data interface 148 can include a business entity which completes a data item of a receipt, in which the output of the OCR could not identify the business name of the entity involved in the transaction.

The processing rules and logic 118 can enable verification of the OCR 112, if certain criteria is met as between the results of the OCR 112 and the results of querying the business directory database 160B. For example, if the business directory database 160B includes a business entity that matches the results of the OCR 112 and which is in a locality associated with the user, then the results of OCR 112 can be considered verified.

If the image corresponds to a business card, the record processing module 110 can incorporate or otherwise utilize functionality corresponding to the classification component 158. For example, such functionality can determine, based on information items 163 from the business card, card information 165, such as the type of business associated with the individual named on the business card. In another embodiment, the classification component 158 can include or otherwise utilize a business card database 162 to determine, based on extracted data items 163 (e.g., an email address on the business card), whether the individual named on the business card is a user of the system 100. If the email address is not already associated with user of the system 100, the user who submitted the business card may receive referral credits to their account.

Similarly, if the financial transaction information includes an odometer reading, the record processing module 110, or other programmatic resources of system 100, can determine from the image data, a mileage amount at the start of a trip, the end of a trip, or at any point during the trip. This data may then be used to generate an expense report for the user who submitted the image data.

In some examples, the external data interface 148 can include programmatic resources that operate to supplement the information items that are determined from an image of a travel itinerary. For example, the record processing module 110 can execute to determine the date and flight number of the user's travel based on the image input 103. Once this information is received, the external data interface 148 can access an external flight database to determine a time of the travel, as well as the flight origination and/or destination. Such information may then be used to automatically generate an amount of miles traveled (e.g., for user's reward program), a price of the ticket and/or an expense report that includes the travel information.

Human Task Force Utilization

Embodiments recognize the inherent limits of using low-quality images to determine information items from images of records. Often, it is not possible, or practical to rely solely on programmatic resources in order to decipher the contents of a record, as depicted in a low-quality image.

In some embodiments, system 100 includes a human management interface 140 that enables work force of humans to perform bulk tasks in relation to determining information about records, as portrayed in a collection of images provided by the user base. While the human workforce can provide a high quality output, it typically comes at a significantly higher cost as compared to programmatic costs. Embodiments recognize that the cost for using the human workforce can be reduced if the tasks assigned to the human workforce can be minimized and/or specialized. For example, rather than having humans view an entire receipt, a human workforce can focus on more discrete tasks, such as for determining or verifying merchant name on receipts. Moreover, embodiments can provide for use of the human workforce in response to failure (or high error rate possibility) from the programmatic sources.

Accordingly, some embodiments described herein use programmatic resources to focus the tasks assigned to the human task force. In this context, the record processing module 110 and/or the human management interface 140 can include functionality that, for example, presents receipts for human processing, with prompts to focus human input on one type of information item (e.g., date). In variations, the functionality can present the human operators of resource 170 with records in which analysis for information items is partially complete (the date and total amount is determined, but the name of the merchant is not). The prompts to the human operators can identify information items that are undetermined following programmatic analysis. Still further, human operators can be utilized to verify programmatic determinations of information items, particularly those information items that are determined with a higher than average or acceptable rate of error.

In one embodiment, the record processing module 110 utilizes the human management interface 140 for cases in which the record was programmatically analyzed, but with partial and/or insufficient information items being determined from the programmatic analysis. In certain embodiments, record processing module 110 identifies individual tasks that are handled by components of the system 100, and/or two or more human operators as provided from the human resource 170. It is also contemplated that tasks may be handled by a combination of the programmatic resources of system 100 and the human resource(s) 170. For example, a task associated with receipt data may be to determine additional data about the received financial transaction and/or to classify the financial transaction.

In certain embodiments, the record processing module 110, or other programmatic resources of system 100, presents the various images of records from the various user base to be processed in bulk by a human task force. The individuals of the human task force can use the human management interface 140 to provide input as to what is depicted by the images of the various records. In some embodiments, the task force is specialized, or separated into groups that are specialized, to focus on a particular aspect of the individual records. For example, a particular individual or group of individuals that comprise the task force can focus on determining the transaction dates appearing on the record to correct or augment information items determined from the OCR 112 and/or other programmatic resources of the system 100.

The human management interface 140 can include a set of human interface rules 142 to programmatically implement (i) determinations as to when tasks are submitted to the human task force; (ii) determinations as to how the tasks presented to the human task force can be structured or organized to enable specialized or dedicated use of the human task force; (iii) logic to resolve conflict or discrepancies between the output of the human task force and the programmatic resources; and/or (iv) logic to resolve conflict or discrepancies amongst human operators.

In certain embodiments, once the required information has been input by the two or more resources, and/or the associated financial transaction has been selected from the financial database 160, the human resource 170 can include the two or more workers to perform the same or similar task on an electronic record. The completed information 147 from each worker is compared and/or combined to determine accuracy and similarity. In certain embodiments, the comparison is performed programmatically, such as by way of a human comparison component 144 of the human interface 140. As discussed above, information 147 provided to the human comparison component 144 may be generated by each of the workers. As such, the information of each resource is compared and/or combined to determine accuracy.

If each of the workers of the human resources 170 have not provided sufficiently similar responses (e.g., the transaction amounts are not equal), the human interface rules 142 and/or comparison component 144 can provide for the task of determining data corresponding to the financial transaction and classifying the financial information to at least reassigned one other worker and the process repeats. This process continues until a threshold number of resources have analyzed the received data or until at least two workers have similar or substantially similar data corresponding to the financial transaction. If a maximum threshold number of workers have been reached and no two workers have matching information 147, the data associated with the financial transaction is deemed to be illegible and the data is discarded.

If however, the human comparison component 144 determines that the information 147 from at least two workers are the similar or substantially similar, the information 147 is assumed to accurately represent the image information received from the user. As a result, an expense report that includes each item contained in the image data may be generated.

As described by various embodiments, the human management interface 140 can provide the record processing module 110 with a task force output 145 that includes (i) information items that supplement those determined programmatically, including those information items which are otherwise necessary for processing the record but were undeterminable by programmatic resources; and/or (ii) corrections or verification of information items that were programmatically determined.

Applying Image of Record for Expensing and Other Uses

As described, the record processing module 110 is able to utilize a various number of resources in order to determine a set of information items that are necessary for processing the record. As noted, some embodiments provide for processing individual records using a set of information items that are determined based in part on the type of record (e.g., credit card receipt, cash receipt, travel itinerary, or business card). In some embodiments, the record processing module 110 generates a record 150 based on depictions of records in individual images 103. The record 150 can be linked to the user account maintained through a service of the system 100. Additionally, the record can be applied to an information or data representing a resource of the user. For example, transaction receipts can be applied against amounts determined from financial accounts of the user. The records 150 for a particular user can be accumulated and made part of expense accounting for the user, or otherwise link to financial assets or obligations of the user.

In some embodiments, the record processing module 110 generates a record 150 using information items that are provided from different programmatic resources, including the OCR 112, the user transaction analyzer 138, and human resources 170. In formulating the record 150, the record processing module 110 may utilize different rules or logic for assembling information items. In one implementation, the necessary information items for a given record are aggregated from each source, assuming no conflict as between an output of the different sources. If conflict exists (e.g., OCR 112 is in conflict with human task force determination), processing rules and logic 118 may provide for (i) prioritizing one determination over another (e.g., human task force output outweighs OCR 112), and (ii) implementing a second check, such as an additional round of human analysis by the human task force, or by a highly trusted human worker. The record processing module 110 may operate identify when such conflicts exist, and resolve them based on the processing rules and logic 118.

In some variations, the comparison logic 114 can be implemented as part of the record processing module 110. The comparison logic 114 can operate to (i) compare results of information items from two or more sources, (ii) identify conflicts, or (iii) identify when results of one source augments or reconciles (or verifies) results from another source.

Still further, some embodiments enable the record processing module 110 to selectively access various resources for determining the information items that are part of the record 150. For example, if the results of the OCR 112 or indeterminate as to a particular information item, a resource selection logic 116 may operate to determine the unknown information items using such other sources. For example, transactions 157 can be analyzed from a database in order to determine merchant name or date ranges, and yellow page directories can be consulted to determine merchants. As described previously, such information can be obtained and used to supplement our augment the programmatic determinations of information items for the particular record 150. Once the record 150 is determined from the image input 103, the record can be linked with the user's account on the service provided by system 100. The database 120, for example, can store the record in connection with the image of the record. The record and its image can subsequently be made available to the user for expense reports, reimbursement receipts, or other request of the user.

Optionally, the record can be associated with a particular type of transaction, or even with a specific event. Transaction logic 154 can process the record and assign the record 150 to a particular type of transaction (e.g., taxable expense). One or more transaction rules 153 can be used to determine a transaction or transaction type.

Methodology

Figure 2:
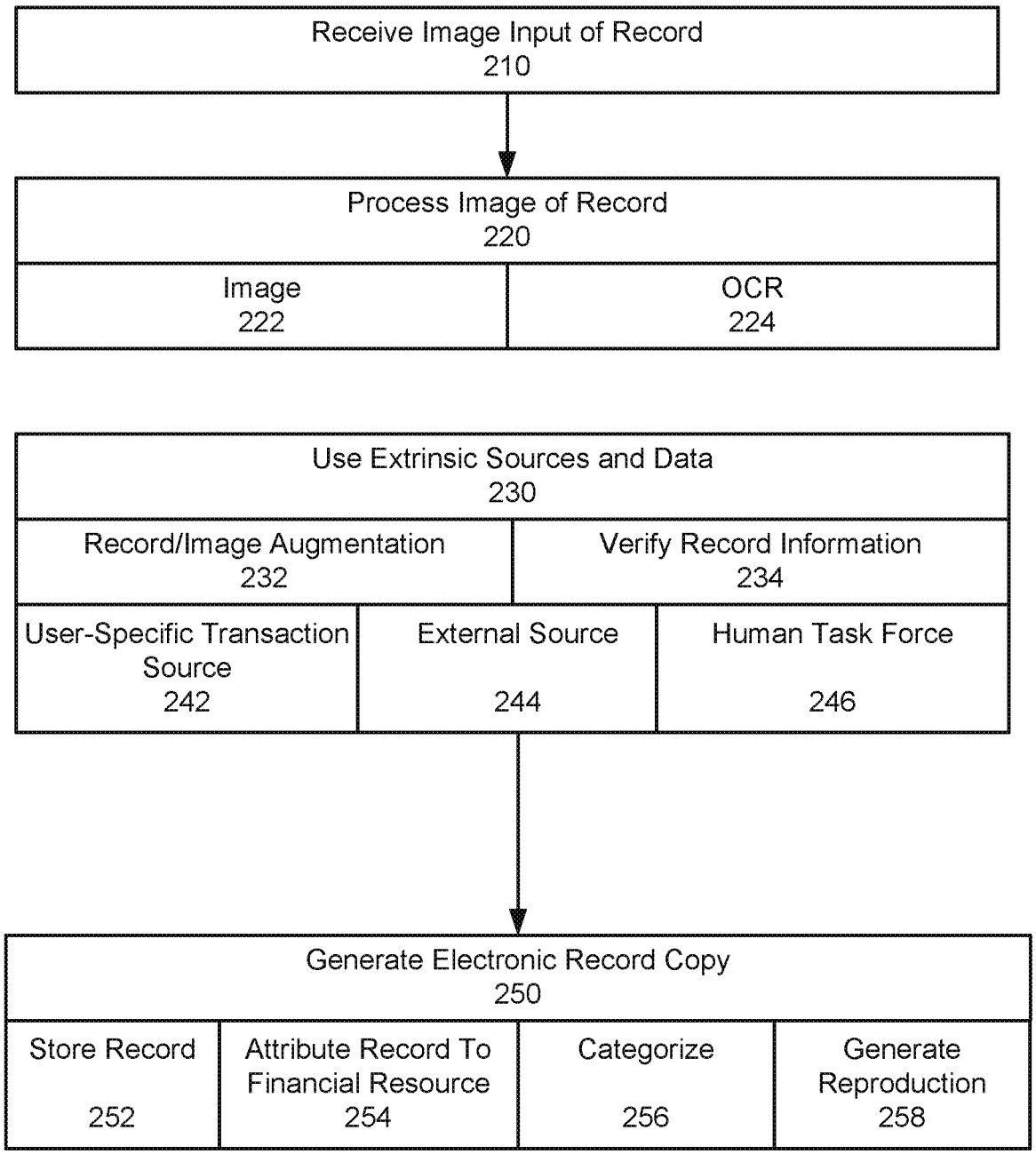
FIG. 2 illustrates a method for determining a record depicted by an image input of the user, according to one or more embodiments.
Figure 4:
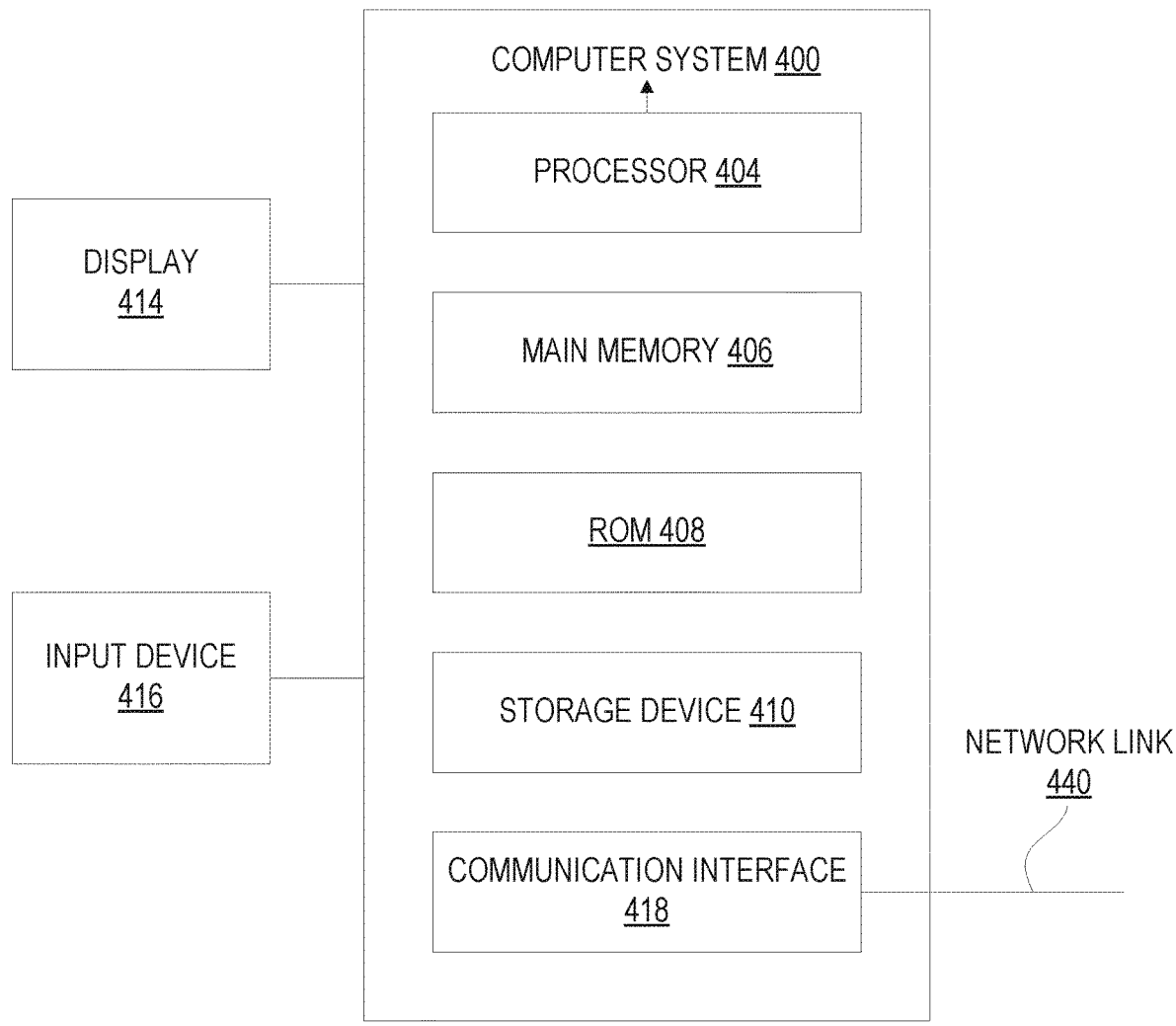
FIG. 4 illustrates a computer system on which a service such as described with an embodiment of FIG. 1 may be provided.

FIG. 2 illustrates a method for determining a record depicted by an image input of the user, according to one or more embodiments. A method such as described by FIG. 2 can be implemented using a system such as described by an embodiment of FIG. 1. A computer system such as described by FIG. 4 is used to implement a method as described. Reference to components or elements described with other figures is provided for purpose of illustrating a suitable component for performing a step or sub step being described.

In some embodiments, image input is received from a user (210). For example, system 100 may operate a service to receive image input from its user base. The image input can include captured images of receipts, business cards, odometer readings, travel itineraries or other records that the user wishes to store with their user account, maintained through the service of system 100.

The image of the record is processed by the system (220). Various forms of image processing can be implemented. In some implementations, the processing can identify information about the media (e.g., a piece of paper corresponding to receipts, business card, odometer on vehicle) of the record depicted in the image input (222). This identification can include determination of geometric properties, character layout, and/or characteristic text items indicative of a particular class or type of record (e.g. indicative of credit card receipt). Additionally, the processing of the image of the record can include optical character recognition of alphanumeric characters appearing on the record (224). One or more optical character recognition algorithms can be used to determine words, numbers, amounts or other special characters (e.g., '$').

Embodiments recognize that the use of camera phones and tablets can yield low quality image input from the user base. For example, paper receipts may not be framed or oriented, or wrinkled when the user captures an image of the receipt. As such, additional processing resources are used in order to determine the information items for individual records. To this end, embodiments recognize that the use of OCR and other image processing techniques can be insufficient for determining the required information items for processing records of images. Accordingly, in addition to image analysis, one or more embodiments provide for the use of resources extrinsic to the image input for purpose of determining information items from the record depicted in the image (230).

The use of such sources and data can be used to augment the information items determined from, for example, OCR or image processing (232). As an alternative or variation, the use of extrinsic resources can be used to verify the programmatic determinations made through image processing, or through use of other resources as described below (234).

As described in various embodiments, the extrinsic sources for augmenting and or validating information items of records include a user specific transaction source (e.g., transactions made on credit cards, debit cards, or online checking accounts by the user) (242). For example, to process receipts for transaction, the information items that are needed include the date of transaction, the total amount, and the name of the entity involved with the transaction (e.g., merchant). If any of the information items are not determinable from programmatic image analysis, other extrinsic resources can be utilized to identify the data items. The data items can be identified based on information determined from, for example, image analysis. For example, the image analysis can yield a date on a receipt. The date on a receipt, for example, can be used as criteria to query a database of user's financial transactions over a given date range in order to identify merchants who may have provided the receipt in question.

In variations, the query may seek to identify clues as to the identity of merchant. For example, if the OCR yields only a partial name of the merchant, the transaction entries of the database 160A can be used to determine the locality of the user during the date range. From the date range, the identity of the merchant can be guessed, based on merchants that are in the same locality and whom have the partial name determined from the image analysis.

Likewise, in many cases, information items determined from programmatically processing the image input can be verified through the use of user specific transaction database 160A. For example, the set of characters that are identified as a date on an image of a receipt can be verified through comparison against a transaction database that contains a transaction with the same merchant on a date that is within an acceptable range from the programmatically determined date.

Another extrinsic source can include external lists of merchants, such as provided by yellow page directories or other business directories (244). For example, the name of the business entity a receipt, the name of a person or business card, the company identified a business card, travel itinerary information and various other information items can be cross referenced to business directories. The cross-referencing of names and businesses can either augment information not otherwise determined from a record, verify information that is determined through, for example, OCR. In the latter case, verification can take place if the programmatically determined name matches an appropriate name in a business directory.

Still further, the image of the record to be processed by human task force (246). In particular, the image of the record can selectively be communicated to human task force, particularly when the image input does not lend itself to programmatic analysis that can identify all necessary information items contained in the record from the image input. The human task force can determine information items and/or verify the determinations made through programmatic analysis. As described with other embodiments, the number of tasks assigned to the human task force can be minimized to conserve on costs.

Based on the processes described, an electronic record copy can be determined for a record of an image input (250). The electronic record copy can be stored with the user's online account (e.g., for a service provided through system 100) (252). The electronic record copy can also be attributed to a financial resource of the user (254). For example, the electronic record copy can be assigned to a user's cash resource, online credit card or banking. The electronic record can also be categorized (256). For example, the record can be categorized as an expense, as a tax deductible (or non-tax deductible) expense, as a purchase, or as miscellaneous. Still further, in some embodiments, the electronic record copy can be reproduced in a manner that meets some established criteria (258). For example, the criteria can provide for the reproduction of the electronic copy to be acceptable by the Internal Revenue Service.

Human Resource Management

Figure 3:
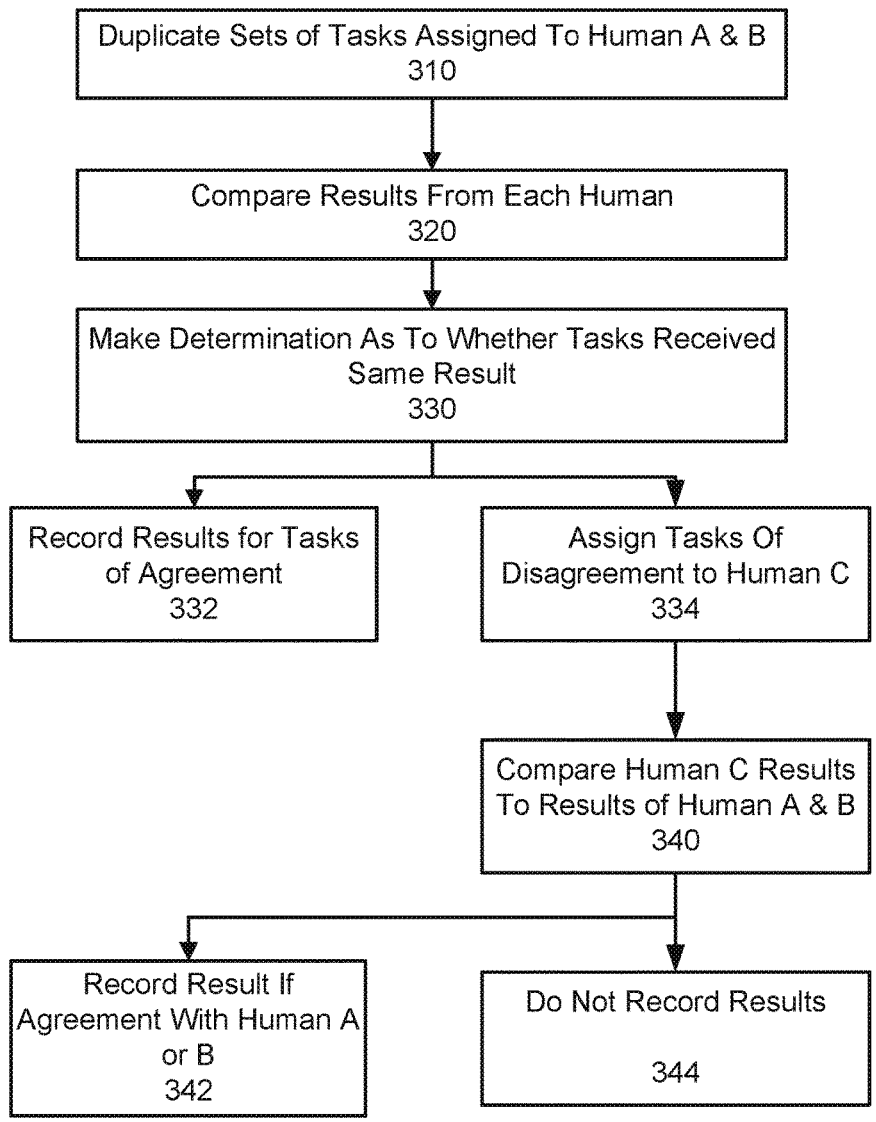
FIG. 3 illustrates a method for managing human resources in processing tasks related to images of records, according to one or more embodiments.

FIG. 3 illustrates a method for managing human resources in processing tasks related to images of records, according to one or more embodiments. A method such as described by FIG. 3 can be implemented using a system such as described by an embodiment of FIG. 1. A computer system such as described by FIG. 4 is used to implement a method as described. Reference to components or elements described with other figures is provided for purpose of illustrating suitable components for performing a step or sub step being described.

An embodiment such as described by FIG. 3 can be implemented to manage human resources and matters cost-efficient and effective. More specifically, embodiments recognize that human resources can process and understand information items on an image of a record better than programmatic resources, but that human resources accomplish such tasks at a greater expense. Recent developments in developing mechanical interfaces for computing environments enable services to rely on a population of humans to accomplish specific discrete tasks which humans can presumably do better than machines. An example of such human resource is Amazon's Mechanical Turk. To human resources in these environments can be relatively unknown entity step process tasks in bulk. As such, issues of quality can arise. For example, while the tasks assigned to the human resources can be discrete or even trivial, the sheer number of task can incentivize cheating, particular as to the fact that most of the participants in the human resource interfaces get paid based on the number of tasks that are completed.

Accordingly, one or more embodiments recognize the propensity for human error when human resources are used. A method such as described by FIG. 3 can be implemented to ensure that in the context of analyzing electronic records (e.g. financial receipt); the human resource output can be relied upon for quality and security.

Initially, task can be assigned to sets of human resources (310), with humans duplicating some or all of the tasks of other humans. For example, a first person in the human resource pool can be assigned a first set of tasks. The first set task can also be duplicated to a second or third individual.

Each task can correspond to a discrete action that a human is to take when viewing an image of a record such as a receipt. Variations may be implemented on the manner in which the task is assigned. In one embodiment, tasks correspond to a particular type of data on a specific kind of record. For example, a task can correspond to determining information items corresponding to one of an entity, it date, or a total cost. According to some embodiments, records can be collected and provided to human resources in bulk, for the purpose of performing a single task, e.g., determine the date on each of the records. By assigning tasks to specific data items, the use of the human resource can be made more limiting and specialized, thus saving cost. In variations, the tasks assigned to the human resources can be to determine the all information not programmatically determinable from each image record, or to verify/determine the information items that are viewable from the image.

The results of duplicate tasks from two or more humans in the human resource pool can be compared (320). The comparison can be made programmatically. Based on the comparison, a determination is made as to whether duplicate tasks assigned to different humans received the same result. To make the determination, programmatic resources track the tasks distributed to the human resource pool, and further record the results for basis of comparison with results of another human in the resource pool.

For tasks which received the same result from two humans in the human pool, the result of the task is recorded for the particular record (332). If two humans received different results, those tasks which are in disagreement are assigned to a third human (334). Optionally, the third human can be one that is known to be credible, based on, for example, past feedback received for that person. The result of the third human can be compared against the results determined from the two other humans, in order to determine if the third human's result matches one of the two prior results (340). If the results from the third human matches one of the prior results, then the result with two humans in agreement is recorded as the result of the task (342) (e.g., data item on record is noted by results of the third human when the third human results match prior result). Otherwise, if the third human returns a different result than the predecessors, then no result is obtained (344).

In variations, the process of checking human results with results of other humans until there is some agreement can be repeated. Moreover, duplicate tasks can be assigned at one time to multiple humans in the pool of the human resource.

Alternatives and Variations

According to some embodiments, a service provided by system 100 can charge a user for at least some select activities. In certain embodiments, when the image input is for a receipt, travel itinerary or odometer reading, and/or an expense report is generated, a user can be charged for the service to determine information items from the image input. In variations, referral credits may be provided to users based on the information items determined from the user's records. For example, if the image is associated with a business card, and if the email address obtained from the business card does not match an existing user's email address, the user who submitted the business card may be given credits as a referral bonus.

Computer System for Implementing Service

FIG. 4 illustrates a computer system on which a service such as described with an embodiment of FIG. 1 may be provided. More specifically, FIG. 4 is a block diagram that illustrates a computer system 400 upon which one or more embodiments may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 414, such as a cathode ray tube (CRT), a LCD monitor, or a television set, for displaying information to a user. An input device 416, including alphanumeric and other keys, is coupled to computer system 400 for communicating information and command selections to processor 404. Other non-limiting, illustrative examples of input device 416 include a mouse, a trackball, or cursor direction keys for communicating direction information and command selections to processor 404 and for controlling cursor movement on display 414. While only one input device 416 is depicted in FIG. 4, embodiments disclosed herein may include any number of input devices 416 coupled to computer system 400.

One or more embodiments are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments disclosed herein are not limited to any specific combination of hardware circuitry and software.

The term "machine-readable storage medium" as used herein refers to any medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 440 to computer system 400.

Communication interface 418 provides a two-way data communication coupling to a network link 440 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 440 typically provides data communication through one or more networks to other data devices. For example, network link 440 may provide a connection through a local network to a host computer or to data equipment operated by an Internet Service Provider (ISP).

Computer system 400 can send messages and receive data, including program code, through the network(s), network link 440 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In various embodiments, system 400 is implemented on a server for devices such as personal computers, portable computers, and mobile devices. The system 400 may be operated as a shared platform, such as one that includes a web application operating on a device (and which communicates with a corresponding server application). In one implementation, the system 100 may be implemented in whole or in part by use of a mobile web application.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for determining record information, the method being implemented by one or more processors and comprising:
   processing an image of a record to determine a record type of multiple record types;
   initiating one or more optical character recognition (OCR) processes to determine a first set of information items from the image of the record;
   determining, based on the determined record type, that the first set of information items is not sufficient to classify the record;
   in response to the determination that the first set of information items is not sufficient, identifying a second set of information items that are likely part of the record but not determinable from the image of the record;
   accessing, over one or more networks, a database resource to determine, based at least in part upon information that is determined from the first set of information items, the second set of information items that are likely part of the record;
   selecting, from a group of multiple predefined classifications, a classification for the record, based on the determined record type, the first set of information items, and the second set of information items; and
   storing, in a database, the record, including the record type, the first set of information items, the second set of information items, and the classification, the record being stored in association with a financial resource of a user.

2. The method of claim 1, where the multiple record types include one or more record types selected from a group consisting of (i) a business card, (ii) an odometer reading, (iii) a cash receipt, and (iv) a travel itinerary.

3. The method of claim 1, wherein the financial resource of the user includes a financial account of the user.

4. The method of claim 1, further comprising verifying information of the first set of information based on a quality of the image.

5. The method of claim 1, wherein the image of the record is transmitted from a mobile computing device of the user.

6. The method of claim 1 further comprising identifying the second set of information items as being likely part of the record but not determinable from OCR-recognized characters provided on the image.

7. The method of claim 1, wherein selecting the classification includes determining that the record is a particular type of financial receipt.

8. The method of claim 1, wherein the database resource comprises one of a merchant and an entity database, and wherein determining the second set of information items includes querying the one of the merchant and entity database using information that is determined from the first set of information items.

9. The method of claim 8, wherein determining the second set of information items further comprises:
   obtaining a plurality of transactions recorded with one or more financial accounts of a user;
   identifying at least a first transaction that is relevant to the record, based on the first set of information items; and
   identifying the second set of information items from information provided with the at least first transaction.

10. The method of claim 9, wherein the second set of information items includes at least one information item selected from a group consisting of (i) a merchant name, (ii) a transaction value, and (iii) a date of a transaction.

11. A non-transitory computer readable medium that stores instructions, which when executed by one or more processors of a computer system, cause the computer system to perform operations that include:
    processing an image of a record to determine a record type of multiple record types;
    initiating one or more optical character recognition (OCR) processes to determine a first set of information items from the image of the record;
    determining, based on the determined record type, that the first set of information items is not sufficient to classify the record;
    in response to the determination that the first set of information items is not sufficient, identifying a second set of information items that are likely part of the record but not determinable from the image of the record;
    accessing, over one or more networks, a database resource to determine, based at least in part upon information that is determined from the first set of information items, the second set of information items that are likely part of the record;
    selecting, from a group of multiple predefined classifications, a classification for the record based on the determined record type, the first set of information items, and the second set of information items; and
    storing, in a database, the record, including the record type, the first set of information items, the second set of information items, and the classification, the record being stored in association with a financial resource of a user.

12. The non-transitory computer readable memory of claim 11, wherein the multiple record types include one or more record types selected from a group consisting of (i) a business card, (ii) an odometer reading, (iii) a cash receipt, and (iv) a travel itinerary.

13. The non-transitory computer readable memory of claim 12, wherein the financial resource of the user includes financial account of the user.

14. The non-transitory computer readable memory of claim 13, wherein the operations further comprise verifying information of the first set of information based on a quality of the image.

15. The non-transitory computer readable memory of claim 11, wherein the database resource comprises one of a merchant and an entity database, and wherein determining the second set of information items includes querying the one of the merchant and entity database using information that is determined from the first set of information items.

16. The non-transitory computer readable memory of claim 15, wherein determining the second set of information items includes:
   obtaining a plurality of transactions recorded with one or more financial accounts of a user;
   identifying at least a first transaction that is relevant to the record, based on the first set of information items; and
   identifying the second set of information items from information provided with the at least first transaction.

17. The non-transitory computer readable memory of claim 16, wherein the second set of information items includes at least one information item selected from a group consisting of (i) a merchant name, (ii) a transaction value, and (iii) a date of a transaction.

18. A computer system comprising:
   one or more processors;
   a memory to store instructions;
   wherein the one or more processors execute the instructions to perform operations that include:
      processing an image of a record to determine a record type of multiple record types;
      initiating one or more optical character recognition (OCR) processes to determine a first set of information items from the image of the record;
      determining, based on the determined record type, that the first set of information items is not sufficient to classify the record;
      in response to the determination that the first set of information items is not sufficient, identifying a second set of information items that are likely part of the record but not determinable from the image of the record;
      accessing, over one or more networks, a database resource to determine, based at least in part upon information that is determined from the first set of information items, the second set of information items that are likely part of the record;
      selecting, from a group of multiple predefined classifications, a classification for the record based on the determined record type, the first set of information items, and the second set of information items; and
      storing, in a database, the record, including the record type, the first set of information items, the second set of information items, and the classification, the record being stored in association with a financial resources of a user.

19. The computer system of claim 18, wherein the database resource comprises one of a merchant and an entity database, and wherein determining the second set of information items includes querying the one of the merchant and entity database using information that is determined from the first set of information items.

20. The computer system of claim 19, wherein determining the second set of information items further comprises:
   obtaining a plurality of transactions recorded with one or more financial accounts of a user;
   identifying at least a first transaction that is relevant to the record, based on the first set of information items; and
   identifying the second set of information items from information provided with the at least first transaction.

* * * * *